Patented May 14, 1946

2,400,461

UNITED STATES PATENT OFFICE 2,400,461

MAGNETIC SEPARATION AND SETTLING FOR SERPENTINE ORES

Robert C. Hills, Nicaro, Cuba, assignor to Nicaro Nickel Company, New York, N. Y., a corporation of Delaware No Drawing. Application April 12, 1944, Serial No. 530,739

12 Claims. (Cl. 75—21)

This invention relates to the recovery of nickel by leaching ores with ammoniacal solutions to dissolve the nickel from other undesired metals and nonmetallic materials. More specifically, it relates to processes for facilitating the separation of ammoniacal product leach liquors from tailings of nickeliferous lateritic serpentine ores which because of their fine particle size and character do not on standing settle at a feasible rate.

Nickeliferous lateritic ores of serpentine character found in several places throughout the world are composed almost wholly of easily friable masses of very finely divided material and because of this fact are ideally suited for leaching operations. The separation of the product leach liquor from the ore tailings, however, presents substantial difficulties to operation on a commercial scale.

In view of the low content of nickel in such ores, running frequently as little as 1–1.5 per cent, an extremely large amount of ore must be handled to recover a small amount of nickel. In the recovery process as ordinarily carried out, the agglomerated ore particles are reduced to a very small size by crushing and furnacing and by the agitation in the aerators in contact with the leach solution. Because of this extremely small particle size, particularly of the nonmetallic particles in the leach solution, the separation of the product leach liquor from the undesired solid particles is a major problem in large scale recovery operations. Separation by filtration is technically feasible to separate the product leach liquor from the ore, but the number and size of filters which would be required for a commercial operation make this method entirely unpracticable.

Countercurrent leaching followed by interstage settling and decantation is a very simple method of accomplishing the separation in equipment employing inexpensive units, but the particle size of the ore tailings in the leach solution is so small that their settling rates are extremely slow, making the number and size of the thickening tanks required economically prohibitive. Separation of the solid particles from these leach solutions can ordinarily be accomplished only if thickening tanks are employed which provide all of 30 to 40 square feet in area per daily ton of ore in each stage. With ores exhibiting the maximum settling difficulty, the unit areas required are much higher. Even with the stated area, the settling of the ore in the leaching system is generally so inadequate that the thickened pulp tailings are considerably more dilute than is economically desirable, leading to a loss of a large volume of leach liquor carried forward in the system by the conventional pumps.

In view of the foregoing difficulties, the object of the present invention is to provide a process for overcoming the poor settling characteristics of serpentine ore tailings and in particular the nonmetallic particles held suspended in ammoniacal leach liquors. This end and other operational advantages are attained by mixing limonite ore with nickeliferous lateritic serpentine ores in adequate amounts, heating the mixed ores under conditions which reduce the nickel content to a form soluble in the ammoniacal solution to be used and at the same time reduce the iron content of both ores substantially to the ferroso-ferric oxide or metallic oxide state, magnetizing these oxide particles in the treated mass, introducing the resulting ore-leaching solution pulp into conventional thickeners or other settling apparatus, and decanting the product liquor from the serpentine and limonite tailings. Through this procedure the magnetized iron oxide particles present overcome the high suspension characteristics of serpentine tailings in the ammoniacal solution by mechanically entrapping the nonmetallic ore particles and forming clusters which rapidly settle out and leave the product leach solution in a substantially clear condition or in a state free of solid impurities which would interfere with subsequent processing.

Nickeliferous lateritic serpentine ore ordinarily contains only about 10 per cent iron. The treatment of this ore alone by reduction of its iron content to the ferroso-ferric oxide state and magnetizing has no practical effect on the settling rate of the nonmetallic ore tailings from the leach solution. The addition of limonite ore (containing an average of about 48 per cent iron) of a nickeliferous lateritic character to the serpentine ore, in accordance with the present invention not only facilitates the subsequent settling but accomplishes the result in a most economical way, for the addition does not increase the ratio of ore treated to the nickel recovered. The admixture of limonite ore with serpentine ore in an adequate proportion and the treatment of the same together provides ready separation not only of the limonite tailings particles but also the substantially nonmetallic serpentine tailings particles. A satisfactory rate of separation can be obtained by mixing 2 parts of limonite ore of average iron content with 1 part of serpentine ore of average iron content. This proportion is of particular value from the point of view of commercial operations in view of the fact that the most accessible of the nickeliferous lateritic ore deposits contain limonite in about twice the quantity of serpentine. A lesser proportion of limonite, however, may be employed but with a sacrifice of settling efficiency. For example, a mixture containing 1 part of limonite with 2 parts of serpentine will settle quite well but about 50 per cent more settling area must be provided with this proportion than with the mixture containing 2 parts of limonite and 1 part of serpentine. Low proportions of only 1 part limonite to 3 parts of serpentine give sufficiently complete separation, but when the limonite is reduced beyond this ratio to any material degree, the settling operation may be considered inoperable as far as commercial operations are concerned due to the much more difficult operation in securing dense pulps and clear solution overflows.

No absolute minimum amount of limonite ore operable in the present process can be given here, for there are several variable factors influencing the amount, such as the percentage of iron in the respective ores, the fineness of the particles, and the effectiveness of the reduction of the iron content to the ferroso-ferric oxide stage. Ordinarily, however, material improvement in settling characteristics can be obtained using an amount of limonite ore which provides a minimum of 20 per cent iron, by weight in the mixture. A ratio of 2 parts of limonite to 1 to 4 parts of serpentine would ordinarily be satisfactory.

In operations in which nickeliferous lateritic ore deposits are employed containing limonite ore and serpentine ore in proportions different from the proportions giving optimum operating results, it may prove more economical in the long run to treat the ores in the proportions naturally occurring in the deposit or to mine the ores together in such manner as to obtain about the desirable proportions.

Since the present invention is applicable to the known leaching processes for recovering nickel from nickeliferous lateritic serpentine ores, no novelty is claimed herein in any specific reduction procedure or in any specific ammoniacal leach operation. The present process is of particular utility when employed in conjunction with the nickel recovery procedures disclosed or referred to in an application Serial No. 460,127, filed September 29, 1942, by my associate, Vas Hubert Brogdon.

The operation of the present invention is exemplified by the following procedure:

Two parts of nickeliferous lateritic limonite ore are mixed with one part of nickeliferous lateritic serpentine ore of 48 per cent and 10 per cent content respectively, such ores being found in Cuba in substantial amounts. The mixture is dried to reduce the moisture content to a substantial degree, is crushed to produce a finely divided mass capable of passing through a 100-mesh screen, next is pre-heated to a temperature of about 1000° F. at a gradual rate which avoids agglomeration and then is subjected to a mixture of reducing gases and heating gases which cause the temperature to rise slowly to a final temperature of from 1300–1400° F., the amount of reducing gas being sufficient to reduce the nickel content and to reduce the ferric oxide substantially only to the ferroso-ferric oxide state, equal parts of reducing gases and combustion gases being satisfactory. The reduction to the indicated stage is ordinarily complete in from one to two hours. Thereupon the reduced ore is cooled in the presence of reducing gas. The cooled or partially cooled mass is then mixed with an ammoniacal leach solution, such as one containing 3 per cent by weight of ammonia as ammonium carbonate and 3 per cent by weight of ammonia as ammonium hydroxide. The leaching operation is carried out in conjunction with aeration preferably in a three or four stage countercurrent leaching bath procedure leading to a final solution of nickel of about 1 per cent. The mixture of the reduced ore and the leach solution upon completion of the aeration is passed between the poles of an electro-magnet or through a magnetizing coil causing magnetization of the magnetic oxide particles in the solution. The emerging suspension is then passed through conventional thickeners wherein the magnetized particles agglomerate and occlude the nonmagnetic particles of the serpentine ore and cause the same to settle out in the form of clusters. The settling area and time are substantially reduced through the agglomerating action of the magnetized particles. The settlement is effectively accomplished in thickeners which provide about five square feet of area per ton of ore per day and with some ores may require only two square feet per ton of ore per day.

Although the above procedure involving as its initial step the pre-mixing of limonite and serpentine ore has substantial advantages and is preferred, some of the beneficial results of the present invention can be obtained by separately reducing the respective ores and magnetizing the iron oxide particles before or after mixing together in a leaching solution before the settling operation is performed.

It should be understood that the present invention is not limited to the specific examples and procedures herein given but that it extends to all equivalents which will occur to those skilled in the art upon consideration of the principles expressed herein and the scope of the claims appended hereto.

I claim:

1. In the recovery of nickel from nickeliferous lateritic serpentine ore by reduction of the nickel content, leaching out the reduced nickel content of the reduced ore with an ammoniacal solution, settling and decanting to separate the product leach liquor from the ore tailings, the process for facilitating such separation which comprises mixing with serpentine ore an addition of nickeliferous lateritic limonite ore prior to the reduction, reducing the iron content of the mixture substantially only to the ferroso-ferric oxide state, and magnetizing such oxide particles before the settling operation, whereby the magnetized particles during settling agglomerate and form clusters with the nonmetallic particles of said serpentine ore and effect more complete separation from the product leach liquor.

2. In the recovery of nickel from nickeliferous lateritic serpentine ore, the combination of steps which comprises mixing nickeliferous lateritic limonite ore with nickeliferous lateritic serpentine ore, reducing the nickel content to a form soluble in ammoniacal leaching solutions and the iron content to the ferroso-ferric oxide state, dissolving out the nickel content by agitating in the presence of an ammoniacal leaching solution, magnetizing the ferroso-ferric oxide particles in the mass and settling and decanting to separate the solids of both ores from the solution.

3. In the recovery of nickel from nickeliferous lateritic sepentine and limonite ore deposits, the combination of steps which comprises mining such ores in such manner as to provide a mixture of the limonite and serpentine ores, reducing the nickel content of the ores to a form soluble in ammoniacal leaching solutions and the iron content of the ores to the ferroso-ferric oxide state, dissolving out the nickel content by agitating in the presence of an ammoniacal leaching solution, magnetizing the ferroso-ferric oxide particles in the mass and setting and decanting to separate the solids of both ores from the solution.

4. The process for the recovery of nickel from nickeliferous lateritic ores which comprises mixing nickeliferous lateritic limonite ore with nickeliferous lateritic serpentine ore, reducing nickel compounds therein substantially to the metallic state and iron compounds to the magnetic oxide state, mixing the reduced mass with an ammoniacal leach solution whereby the reduced nickel becomes dissolved therein, magnetizing the magnetic oxide particles of the mass, and finally settling whereby the magnetized particles carry down the nonmagnetic ore particles and effect clean separation from the solution.

5. The process of facilitating settling and decantation in the separation of finely divided ore tailings from ammoniacal product leach liquors derived by reducing nickeliferous lateritic serpentine ores and mixing the reduced ore obtained with ammoniacal leach solution to dissolve the nickel, which comprises, adding to said mixture finely divided magnetized particles of limonite ore reduced to the magnetic oxide stage, and decanting off the product leach liquor from the ore tailings which settle rapidly with said magnetized particles.

6. The process of speeding up and making more complete the settling of nonmagnetic particles in ore tailings from an ore-leach solution pulp composed of a reduced nickeliferous lateritic serpentine ore in ammoniacal solution which comprises incorporating in said pulp magnetized particles of partially reduced limonite ore, and then by their difference in specific gravity separating the resulting mixture into substantially clear product leach liquor containing dissolved nickel compounds and solid matter composed of ore tailings in intimate mixture with the magnetized reduced ore particles.

7. The process of recovering nickel from nickeliferous lateritic serpentine ore which comprises adding nickeliferous lateritic limonite ore to such serpentine ore in a quantity which brings about settling of the nonmagnetic ore particles in said ores in the settling step specified herein; reducing the nickel content therein substantially to metallic nickel and the iron content therein to the ferroso-ferric oxide state, mixing the reduced mixture in finely divided state with an ammoniacal solution whereby the reduced nickel is dissolved, passing the resulting pulp through a magnetic field adapted to magnetize the iron oxide particles, and settling out from the product leach liquor the nonmetallic ore tailings which collect in clusters with the magnetized ore particles.

8. The process of recovering nickel from nickeliferous lateritic serpentine ore which comprises adding nickeliferous lateritic limonite ore to such serpentine ore in a quantity which provides a minimum of about 20 per cent iron in the resulting mixture, reducing the nickel content therein substantially to metallic nickel and the iron content therein to the ferroso-ferric oxide state, mixing the reduced mixture in finely divided state with an ammoniacal solution whereby the reduced nickel is dissolved, passing the resulting pulp through a magnetic field adapted to magnetize the iron oxide particles, and settling out from the product leach liquor the nonmetallic ore tailings which collect in clusters with the magnetized ore particles.

9. The process for the recovery of nickel from nickeliferous lateritic ores which comprises subjecting nickeliferous lateritic serpentine ore to reduction whereby the nickel content is reduced substantially to the metallic state, subjecting nickeliferous lateritic limonite ore to reduction whereby nickel compounds therein are reduced substantially to the metallic state and iron compounds therein are reduced to the magnetic oxide state, mixing the reduced ores with an ammoniacal leach solution until the reduced nickel becomes dissolved therein, magnetizing the magnetic oxide particles of the reduced ores, and finally settling, whereby the magnetized particles rapidly carry down the nonmagnetic particles and effect clean separation from the solution.

10. The process for the recovery of nickel from nickeliferous lateritic ores which comprises subjecting nickeliferous lateritic serpentine ore to reduction whereby nickel compounds therein are substantially reduced to the metallic state, mixing the reduced mass with an ammoniacal leach solution, whereby the reduced nickel becomes dissolved therein, subjecting nickeliferous lateritic limonite ore to reduction, whereby nickel compounds therein are reduced substantially to the metallic state and iron compounds to the magnetic oxide state, mixing the resulting reduced mass with an ammoniacal leach solution whereby the reduced nickel becomes dissolved therein, magnetizing the magnetic oxide particles of said last-mentioned mass, mixing together the two ore-leaching solution pulps obtained, settling the pulps, whereby the magnetic particles and the nonmagnetic particles come down together, and decanting the substantially clear product leach liquors obtained.

11. The process for the recovery of nickel from nickeliferous lateritic ores which comprises subjecting nickeliferous lateritic limonite ore to reduction, whereby the nickel compounds therein are reduced substantially to the metallic state and iron compounds therein to the magnetic oxide state, subjecting nickeliferous lateritic serpentine ore to reduction, whereby nickel compounds therein are reduced substantially to the metallic state, mixing the reduced serpentine ore with the reduced limonite ore, mixing the resulting mass with an ammoniacal leach solution to dissolve the nickel content thereof, passing the resulting mixed ore pulp between the poles of an electro-magnet, whereby the magnetic oxide particles therein become magnetized and finally settling the thus-treated pulp, whereby the magnetic particles cause accelerated settling of the nonmagnetic particles in the pulp and substantially clear product leach liquor is obtainable by decantation.

12. In the recovery of nickel from finely divided nickeliferous lateritic ores by reduction of the nickel compounds of said ore, leaching out the reduced nickel content with an ammoniacal solution, settling and decanting to separate the product leach liquor from the ore tailings, the improvement which comprises initially starting with a mixture of such ores in the ratio of 2 parts ore to 1 to 4 parts limonite ore and before settling the ore-leach solution pulp, magnetizing the magnetic iron oxide particles contained in the reduced ores, whereby upon settling the magnetized ore particles mechanically assist in the settling of the nonmagnetic ore particles.

ROBERT C. HILLS.